US 8,820,858 B2

(12) United States Patent
Kodama

(10) Patent No.: US 8,820,858 B2
(45) Date of Patent: Sep. 2, 2014

(54) BRAKE HYDRAULIC PRESSURE CONTROL APPARATUS FOR VEHICLE

(75) Inventor: Takuro Kodama, Nagano (JP)

(73) Assignee: Nissin Kogyo Co., Ltd., Nagano (JP)

( * ) Notice: Subject to any disclaimer, the term of this patent is extended or adjusted under 35 U.S.C. 154(b) by 522 days.

(21) Appl. No.: 13/095,492

(22) Filed: Apr. 27, 2011

(65) Prior Publication Data
US 2011/0265901 A1 Nov. 3, 2011

(30) Foreign Application Priority Data

Apr. 28, 2010 (JP) .................................. 2010-102877
Apr. 28, 2010 (JP) .................................. 2010-102878

(51) Int. Cl.
*B60T 8/36* (2006.01)

(52) U.S. Cl.
USPC ...................................................... 303/119.3

(58) Field of Classification Search
CPC ............................... B60T 8/368; B60T 8/3675
USPC ............... 303/10, 115.5, 116.1, 116.3, 116.4, 303/119.1–119.3, DIG. 10; 277/594, 596; 417/363, 360, 322
See application file for complete search history.

(56) References Cited

U.S. PATENT DOCUMENTS

| 6,048,041 | A * | 4/2000 | Mueller et al. ............. 303/119.2 |
| 6,293,634 | B1 * | 9/2001 | Hosoya ...................... 303/119.2 |
| 7,905,558 | B2 * | 3/2011 | Wagu et al. ................ 303/119.3 |

| 2007/0012528 | A1 | 1/2007 | Wagu et al. |
| 2008/0165510 | A1 * | 7/2008 | Nishimoto et al. ........... 361/752 |
| 2009/0001808 | A1 * | 1/2009 | Kodama et al. ............. 303/119.1 |

FOREIGN PATENT DOCUMENTS

| DE | 3729549 A1 | 3/1989 |
| EP | 2008895 A2 | 12/2008 |
| JP | 8011691 | 1/1996 |
| JP | 08011691 A * | 1/1996 | ................ B60T 8/34 |
| JP | 11511413 | 10/1999 |
| JP | 2000008890 A | 1/2000 |
| JP | 2001132621 A | 5/2001 |
| JP | 2001186739 | 7/2001 |
| JP | 200722223 A | 2/2007 |

(Continued)

OTHER PUBLICATIONS

Japanese Patent Office Action for Appl. No. 2010-102877 dated Feb. 21, 2012.

(Continued)

*Primary Examiner* — Xuan Lan Nguyen
(74) *Attorney, Agent, or Firm* — Andrew M. Calderon; Roberts Mlotkowski Safran & Cole, P.C.

(57) ABSTRACT

A brake hydraulic pressure control apparatus for a vehicle includes: a base member; a control housing including a storage space for storing an electromagnetic valve on one face of the base member and a coil assembly; and a pump driving motor on a back face of the base member. The base member are provided with: two housing mounting penetration holes through which housing mounting screws for fixing the control housing are to be inserted; two motor mounting holes into which motor mounting screws for fixing the motor are to be inserted; and a rotation shaft storage hole into which a rotation shaft of the motor is to be stored, wherein the housing mounting penetration holes and the motor mounting holes are respectively disposed point-symmetrically with respect to the center of the rotation shaft storage hole.

13 Claims, 9 Drawing Sheets

(56) References Cited

FOREIGN PATENT DOCUMENTS

| | | |
|---|---|---|
| JP | 2008115963 | 5/2008 |
| JP | 2008189295 A | 8/2008 |
| JP | 2009006855 | 1/2009 |
| JP | 2009107473 A | 5/2009 |
| WO | WO9710979 | 3/1997 |

OTHER PUBLICATIONS

Japanese Patent Office Action for Appl. No. 2010-102878 dated Feb. 21, 2012.

Extended European Search Report for Application No. EP11164065 dated Mar. 26, 2012.

\* cited by examiner

BRAKE HYDRAULIC PRESSURE CONTROL APPARATUS FOR VEHICLE

CROSS REFERENCE TO RELATED APPLICATION(S)

This application claims the benefit of priority from Japanese Patent Application No. 2010-102878 filed on Apr. 28, 2010, and Japanese Patent Application No. 2010-102877 filed on Apr. 28, 2010, the disclosure of which is incorporated herein by reference in its entirety.

BACKGROUND

1. Field

An aspect of the present application relates to a brake hydraulic pressure control apparatus fox a vehicle.

2. Description of the Related Art

As a brake hydraulic pressure control apparatus for a vehicle, there is known an apparatus as shown in JP-A-2009-6855. In the brake hydraulic pressure control apparatus for a vehicle disclosed in JP-A-2009-6855, there is formed a housing mounting hole in a face of a housing apparatus which is disposed opposed to a base member, and also, there is formed a housing mounting penetration hole in the base member. And, a housing mounting screw is inserted into the housing mounting penetration hole from the side of the opposite face (back face) of the base member that exists on the opposite side of the housing mounting face, and the leading end of the housing mounting screw is threadedly engaged with the housing mounting hole of the housing apparatus to fasten the housing apparatus and the base member to each other integrally, whereby the housing apparatus is fixed to the base member.

On the other hand, in the back face of the base member, there is formed a motor mounting hole, a motor mounting screw is inserted into a flange portion formed in a motor to threadedly engage the leading end of the motor mounting screw with the motor mounting hole, whereby the motor is fixed to the base member.

According to the above structure, there can be provided the following operation effects. That is, the housing mounting screw is penetrated through the base member from the back face thereof and is threadedly engaged with the housing mounting hole, whereby the housing apparatus is fixed to the base member. On the other hand, the motor mounting screw is inserted through the flange portion and is threadedly engaged with the motor mounting hole, whereby the motor is fixed to the base member. Therefore, a screw may not extend over three composing members, thereby being able to minimize the tolerance between the composing members.

However, in the above-structured brake hydraulic pressure control apparatus for a vehicle, since the four housing mounting screws and two motor mounting screws are used, basically, there may be formed the housing mounting penetration holes and motor mounting holes which correspond to the respective screws. This puts restrictions on the pipe line and layout of the interior portions of the base member, which makes it difficult to reduce the size of the base member. Further, the number of composing parts and the number of working operations may be increased.

As a brake hydraulic pressure control apparatus for a vehicle, there is known such a control apparatus as shown in JP-A-11-511413 (FIG. 2). In JP-A-11-511413, as a seal structure for sealing between a base member and a control housing, there is disclosed a structure in which an outside seal member for sealing between the base member and control housing and an inside seal member held elastically between a coil assembly and base member are formed integrally with each other.

However, in the above-cited seal structure, the reacting force of the inside seal member is applied to the coil assembly. Due to this, the control housing may be deformed due to a stress applied thereto from the coil assembly and may be floated from the base member. This creates a clearance between the base member and control housing, resulting in the deteriorated seal performance between them.

SUMMARY

In view of the above, it is a first object of the invention to provide a brake hydraulic pressure control apparatus for a vehicle which can reduce the size of the base member thereof.

With the first object in mind, there is provided a brake hydraulic pressure control apparatus for a vehicle, the apparatus including: a base member; a control housing including a storage space for storing an electromagnetic valve provided on one face of the base member and a coil assembly to be mounted onto the electromagnetic valve; and a pump driving motor provided on a back face disposed opposed to the one face of the base member, wherein the base member are provided with: two housing mounting penetration holes, wherein each of the housing mounting penetration holes is so formed as to penetrate from the one face to the back face and through which a housing mounting screw for fixing the control housing is to be inserted; two motor mounting holes, wherein each of the motor mounting holes is opened up in the back face and into which a motor mounting screw for fixing the motor is to be inserted; and a rotation shaft storage hole which is opened up in the back face and into which a rotation shaft of the motor is to be stored, wherein the housing mounting penetration holes are disposed point-symmetrically with respect to the center of the rotation shaft storage hole, wherein the motor mounting holes are disposed point-symmetrically with respect to the center of the rotation shaft storage hole at different positions from positions where the housing mounting penetration holes are disposed.

According to this structure, the housing mounting penetration holes and motor mounting holes are respectively disposed point-symmetrically with respect to the center of the rotation shaft storage hole, whereby they are disposed in a well balanced manner. This can minimize the number of portions for mounting the housing and motor onto the base member. Due to this, the number of parts can be reduced as well as the space of the base member can be reduced and the layout efficiency thereof can be enhanced, thereby the size of the base member can be accomplished.

And, according to the invention, preferably, the housing mounting penetration holes and the motor mounting holes may be arranged to constitute vertices of a quadrangle when viewed from the back face.

According to this structure, since the housing mounting penetration holes and motor mounting holes, when viewed from the back face of the base member, are disposed in a well balanced manner in the horizontal direction and in the vertical direction, the enhancement in the anti-vibration properties of the base member and the further reduction of the size of the base member can be attained.

Also, according to the invention, preferably, in the base member, there may be formed a pair of pump storage holes respectively penetrating from the rotation shaft storage hole to side faces of the base member, wherein the housing mounting penetration holes and motor mounting holes may be disposed to sandwich the pump storage holes at positions existing adjacently to the pump storage holes but not interfering with the pump storage holes.

According to this structure, since the housing mounting penetration holes and motor mounting holes are disposed to sandwich the pump storage holes at positions existing adjacently to the pump storage holes but not interfering with the pump storage holes, the dimension of the base member in a direction perpendicular to the axial direction of the pump storage hole can be minimized.

Further, according to the invention, preferably, when viewed from the back face of the base member, an opening portion of the control housing existing on the base member side may be located within a range of a circle having a diameter the two ends of which are constituted of two positions of the housing mounting penetration holes.

According to this structure, since the width of the opening portion of the housing is not excessively larger than the distance between the fixing portions of the control housing (two housing mounting penetration holes), the fastening forces of the two housing mounting screws can be transmitted effectively over the whole periphery of the opening portion of the storage space, thereby being able to enhance the fixing performance of the control housing to the base member.

Also, preferably, the opening portion of the control housing may have a square shape.

Here, the term "square shape" means a quadrangle shape the respective sides of which are equal in length and also includes a quadrangle shape the corner portions of which are chamfered respectively. According to this structure, since the two housing mounting screws can be disposed in a well balanced manner with respect to the opening portion of the storage space, the fixing performance of the control housing to the base member can be enhanced still further.

Further, according to the invention, preferably, the control housing may have a peripheral wall portion that defines the storage space, and the peripheral wall portion may have a flange portion formed projecting outwardly, wherein, in the flange portion, there may be formed a housing fixing hole threadedly engageable with the housing mounting screw and a reinforcing rib extending from the peripheral portion of the housing fixing hole to the outer peripheral edge portion of the peripheral wall portion.

According to the this structure, since the fastening forces of the two housing mounting screws can be effectively transmitted through the reinforcing rib to the outer peripheral edge portion of the peripheral wall portion, the fixing performance of the control housing to the base member can be enhanced yet further.

Also, according to the invention, preferably, when viewed from the back face, the center position of the rotation shaft of the motor and the center position of the opening portion of the control housing existing on the base member side may overlap each other.

According to this structure, since the weight balance between the motor and control housing can be enhanced, the motor and control housing can be stably fixed to the base member, thereby being able to enhance the fixing performance of the motor and control housing to the base member still further.

Further, according to the invention, preferably, the peripheral wall portion of the control housing that defines the storage space may be formed to have a quadrangle frame shape, of the four sides of the peripheral wall portion, in a pair of mutually opposed sides, there may be formed flange portions respectively projecting outwardly and, in the flange portions, there may be formed housing fixing holes threadedly engageable with the housing mounting screws. And, between the one face of the base member and the peripheral wall portion, there may be interposed a seal member. And, the seal member may include a quadrangle frame shaped peripheral edge portion along the peripheral wall portion and a plurality of belt-shaped tongue portions respectively projecting from their associated sides of the peripheral edge portion inwardly, while the tongue portions may include fixed portion adjacent tongue portions respectively formed in the paired sides of the peripheral wall portion adjoining the housing fixing hole. Also, the tongue portion may be held by the base member and coil assembly only at the forming positions where the fixed portion adjacent tongue portions are formed.

According to this structure, although there is generated a reacting force (restoring force) in the fixed portion adjacent tongue portion held by the coil assembly and base member, since this portion is fastened by the housing mounting screw, the control housing and coil assembly are prevented from being separated from the base member, thereby eliminating a possibility that the seal performance of this portion can be deteriorated.

Further, according to the invention, preferably, the peripheral wall portion and the peripheral edge portion of the seal member may be respectively formed to have a square frame shape.

According to this structure, since the seal member can be assembled in any installation directions thereof at a unit of 90 degree and thus there is no need to restrict the installation directions of the seal member, the efficiency of the seal member assembling operation can be enhanced.

And, according to the invention, preferably, the tongue portions may further include fixed portion remote tongue portions respectively formed in the other sides than the paired sides extending perpendicularly to the paired sides, and the coil assembly may be disposed spaced from the fixed portion remote tongue portions.

According to this structure, since other tongue portions (fixed portion remote tongue portions) than the fixed portion adjacent tongue portions strongly fastened by the housing mounting screws are not held by the coil assembly and base member, there is no possibility that a reacting force larger than necessary can be generated in such portions. This can prevent the control housing from being deformed in the portions thereof not fastened, thereby being able to prevent the seal performance from being deteriorated.

Also, according to the invention, preferably, in the respective sides of the peripheral edge portion, there may be formed the fixed portion adjacent tongue portions or fixed portion remote tongue portions in such a manner that they have the same shape.

According to this structure, since the respective sides of the peripheral wall portion are the same in shape, the seal member can be assembled freely in any directions thereof at a unit of 90 degree. Thus, there is no need to restrict the installation direction of the seal member, thereby being able to enhance the efficiency of the seal member assembling operation.

It is a second object of the invention to provide a brake fluid pressure control device for a vehicle which can prevent the deteriorated seal performance between the base member and control housing.

With the second object in mind, there is provided a brake hydraulic pressure control apparatus for a vehicle, the apparatus including: a base member; a control housing including a storage space for storing an electromagnetic valve provided on one face of the base member and a coil assembly to be mounted onto the electromagnetic valve; and a pump driving motor provided on a back face disposed opposed to one face of the base member, wherein the control housing has a peripheral wall portion that defines the storage space and that is formed to have a quadrangle frame shape, of the four sides of the peripheral wall portion, in a pair of sides disposed opposed to each other, there are formed flange portions respectively projecting outwardly, and, in the flange portions, there are formed housing fixing holes threadedly engageable with the housing mounting screws, wherein, between the one face of the base member and the peripheral wall portion, there is interposed a seal member, and the seal member includes a quadrangle frame shaped peripheral edge portion extending along the peripheral wall portion and a plurality of belt-shaped tongue portions respectively projecting from their associated sides of the peripheral edge portion inwardly, the tongue portions include fixed portion adjacent tongue portions respectively formed in the paired sides of the peripheral wall portion adjoining the housing fixing hole, and the tongue portion is held by the base member and the coil assembly only at positions where the fixed portion adjacent tongue portions are formed.

According to this structure, although there is generated a reacting force (restoring force) in the fixed portion adjacent tongue portions held by the coil assembly and base member, since these portions are fastened by the housing mounting screws respectively, the control housing and coil assembly are prevented from being separated from the base member, thereby being able to prevent the seal performance of these portions from being deteriorated.

Also, according to the invention, preferably, the peripheral wall portion and the peripheral edge portion of the seal member may respectively be formed to have a square frame shape.

According to this structure, the seal member can be assembled freely in any installation directions thereof at a unit of 90 degree. This eliminates the need to restrict the installation directions of the seal member and thus can enhance the efficiency of the operation to assemble the seal member.

And, according to the invention, preferably, the tongue portions may further include fixed portion remote tongue portions respectively formed in the other sides than the above paired sides extending perpendicularly to the fixed portion adjacent tongue portions, and the coil assemblies may be disposed spaced from the fixed portion remote tongue portions.

According to this structure, since other tongue portions (fixed portion remote tongue portions) than the fixed portion adjacent tongue portions strongly fastened by the housing mounting screws are not held by the coil assembly and base member, there may be no possibility that a reacting force larger than necessary can be generated. This can prevent the control housing from being deformed in the portion thereof not fastened, thereby being able to prevent the seal performance of such portion from being deteriorated.

Also, according to the invention, preferably, in the respective sides of the peripheral edge portion, there may be formed the fixed portion adjacent tongue portions and fixed portion remote tongue portions in such a manner that they have the same shape.

According to this structure, since the respective sides of the peripheral wall portion are the same in shape, even when the seal member is installed in any directions at a unit of 90 degree, the seal member can be assembled freely. Thus, there is no need to restrict the installation directions of the seal member, thereby being able to enhance the assembling performance of the seal member.

Further, according to the invention, preferably, wherein the base member may be provided with two housing mounting penetration holes, wherein each of the housing mounting penetration holes may be so formed as to penetrate from the one face to the back face and through which a housing mounting screw for fixing the control housing is to be inserted; two motor mounting holes, wherein each of the motor mounting holes may be opened up in the back face and into which a motor mounting screw for fixing the motor is to be inserted; and a rotation shaft storage hole which is opened up in the back face and into which a rotation shaft of the motor is to be stored, wherein the housing mounting penetration holes may be disposed point-symmetrically with respect to the center of the rotation shaft storage hole, wherein the motor mounting holes may be disposed point-symmetrically with respect to the center of the rotation shaft storage hole at different positions from positions where the housing mounting penetration holes are disposed, wherein the housing mounting penetration holes and the motor mounting holes may be arranged to constitute vertices of a quadrangle when viewed from the back face.

According to this structure, the housing mounting penetration holes and motor mounting holes are respectively disposed point-symmetrically with respect to the center of the rotation shaft storage hole, whereby they are disposed in a well balanced manner. This can minimize the number of portions for mounting the housing and motor onto the base member. Due to this, the number of parts can be reduced; and also, the space of the base member can be reduced and the layout performance thereof can be enhanced. This makes it possible to reduce the size of the base member. Also, since the housing mounting penetration holes and motor mounting holes, when viewed from the back face of the base member, are disposed in a well balanced manner in the horizontal direction and in the vertical direction, the fixing strength of the control housing to the base member is enhanced. This can enhance the seal performance between them as well as can enhance the anti-vibration properties of this structure and can further reduce the size of the base member.

Also, according to the invention, preferably, in the base member, there may be formed a pair of pump storage holes respectively penetrating from the rotation shaft storage hole to side faces of the base member, wherein the housing mounting penetration holes and motor mounting holes may be disposed to to sandwich the pump storage holes at positions existing adjacently to the pump storage holes but not interfering with the pump storage holes.

According to this structure, since the housing mounting penetration holes and motor mounting holes are disposed to sandwich therebetween the pump storage holes at positions existing adjacently to the pump storage holes but not interfering with the pump storage holes, the dimension of the base member in a direction perpendicular to the axial direction of the pump storage hole can be minimized.

Further, according to the invention, preferably, the center of gravity of the brake hydraulic pressure control apparatus may be located inside the quadrangle According to this structure, the present control apparatus can be fixed in a well balanced manner with a reduced number of screws.

According to a first aspect of the brake hydraulic pressure control apparatus for a vehicle of the invention, there can be obtained the effect that the base member can be reduced in size.

According to a second aspect of the brake hydraulic pressure control apparatus for a vehicle of the invention, there can be obtained the excellent effects that the deformation of the control housing can be prevented and the seal performance between the base member and control housing can be prevented against deterioration.

BRIEF DESCRIPTION OF THE DRAWINGS

A general configuration that implements the various feature of the invention will be described with reference to the drawings. The drawings and the associated descriptions are provided to illustrate embodiments of the invention and should not limit the scope of the invention.

DETAILED DESCRIPTION OF THE EMBODIMENTS)

Now, description will be given below specifically of an embodiment for carrying out the invention with reference to the accompanying drawings. Firstly, description will be given of the whole structure of a brake hydraulic pressure control apparatus for a vehicle according to the present embodiment.

Figure 1:
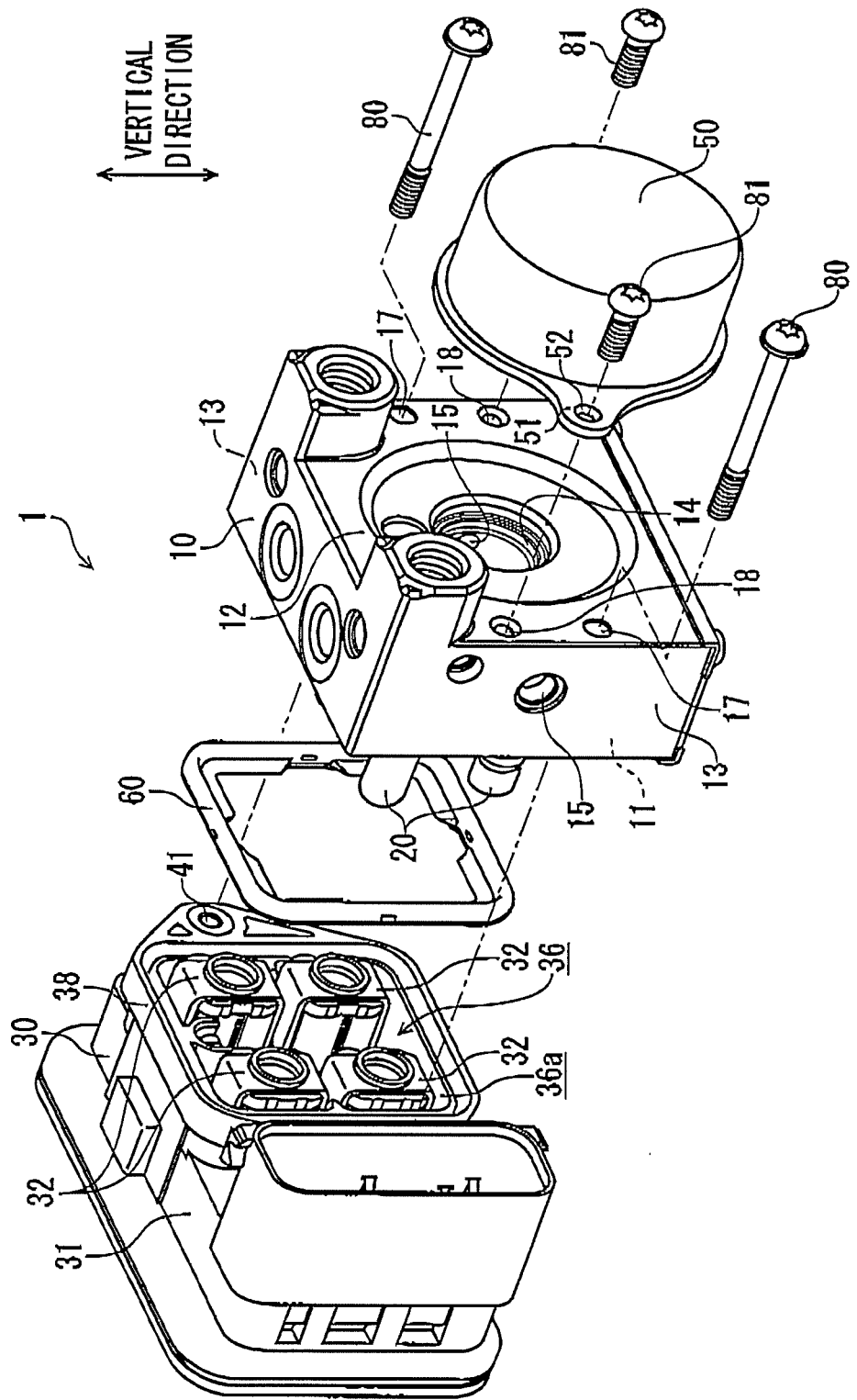
FIG. 1 is an exploded perspective view of a brake hydraulic pressure control apparatus for a vehicle according to an embodiment of the invention.
Figure 2:
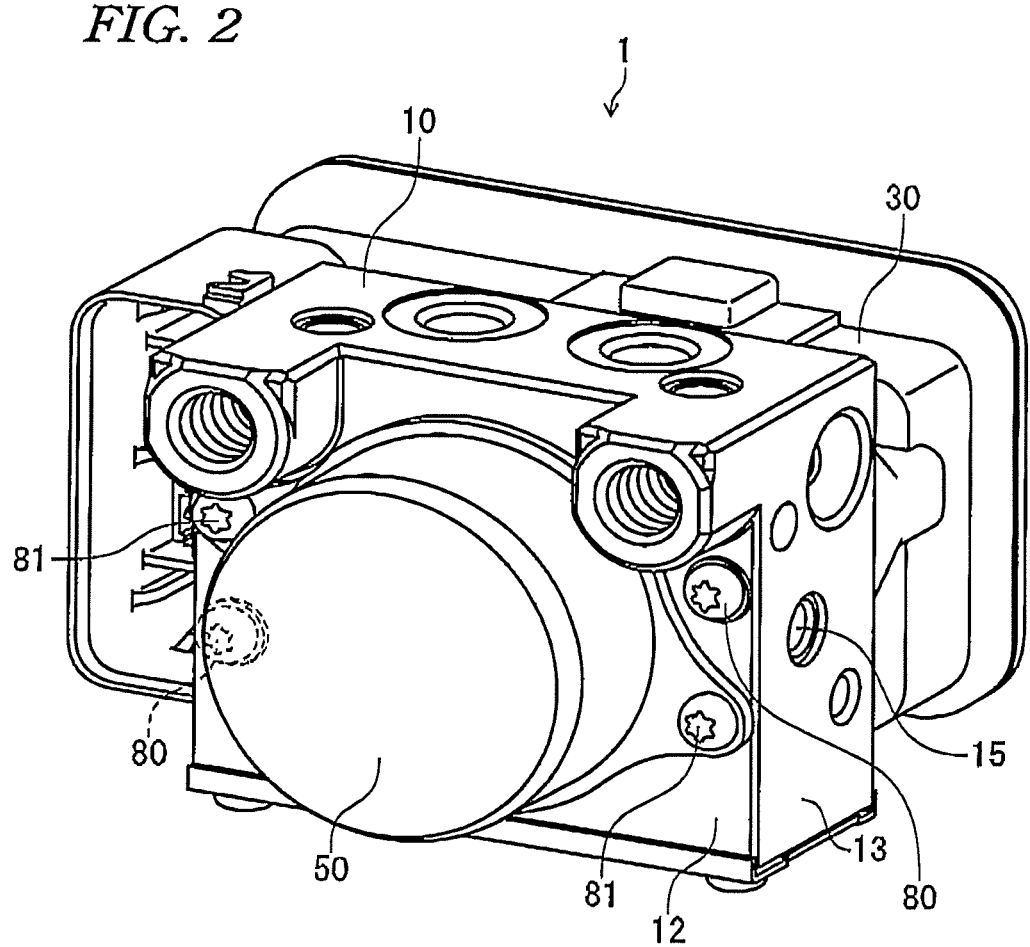
FIG. 2 is a perspective view of the brake hydraulic pressure control apparatus for a vehicle according to the embodiment of the invention.

As shown in FIGS. 1 and 2, the brake hydraulic pressure control apparatus for a vehicle 1 (hereinafter, referred to as a brake hydraulic pressure control apparatus) according to the present embodiment includes a base member 10, electromagnetic valves 20 respectively provided on one face 11 of the base member 10, a control housing 30 mounted on one face 11 of the base member 10, and a motor 50 provided on a back face (the face on the rear side of one face 11) 12 of the base member 10 which is located on the opposite side of one face 11. Between one face 11 of the base member 10 and control housing 30, there is interposed a seal member (see FIG. 1).

As shown in FIG. 1, the base member 10 is a metal member which is formed to have a substantially rectangular parallelepiped shape and, in the interior portion of the base member 10, there are formed a flow passage for brake fluid, a motor rotation shaft storage hole 14, pump storage holes 15, and the like. The rotation shaft storage hole 14 is a bottomed hole which is opened up in the back face 12 of the base member 10 and has a circular shaped section; and, into the rotation shaft storage hole 14, there can be stored the rotation shaft (not shown) of the motor 50. The pump storage holes 15 are holes which respectively penetrate from the rotation shaft storage hole 14 to two side faces 13 of the base member 10, while they are disposed on the two sides of the rotation shaft storage hole 14 as a pair. The pump storage holes 15 respectively extend in a direction perpendicular to the side faces 13 (in a normal direction of the side faces 13). The pump storage holes 15 are respectively formed on the same axial line of the base member 10. In one face 11 of the base member 10, there are formed mounting holes 16 (see FIGS. 6 and 7) which are respectively used to mount their associated electromagnetic valves 20 in such a manner that the mounting holes 16 are in communication with the flow passage of the brake fluid respectively.

Figure 5:
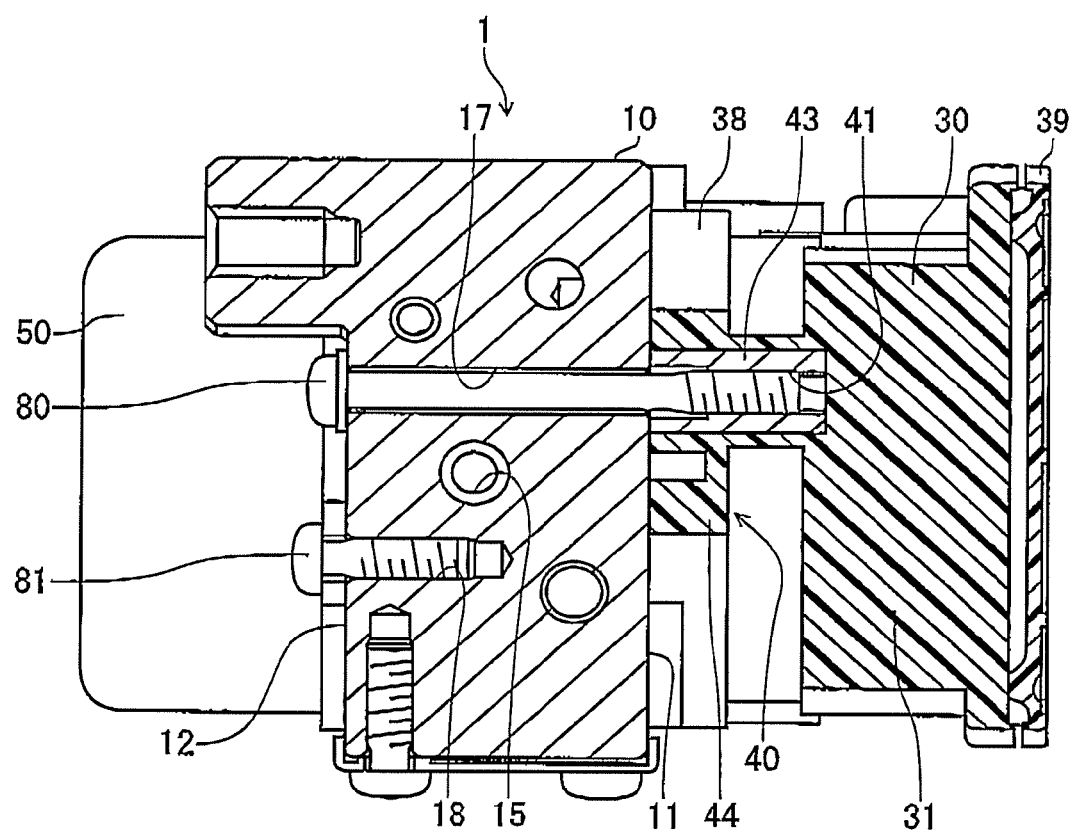
FIG. 5 is a section view taken along the V-V line shown in FIG. 3.

As shown in FIGS. 1 and 5, in the base member 10, there are formed a housing mounting penetration hole 17 and a motor mounting hole 18. The housing mounting penetration hole 17 is a hole through which there can be penetrated a housing mounting screw 80 for fixing the control housing 30 to the base member 10. The housing mounting penetration hole 17 is formed to penetrate the base member 10 in such a manner that it is opened on both of the one face 11 and back face 12 of the base member 10, while this hole 17 extends in a direction perpendicular to one face 11 (in a normal direction of one face 11).

The motor mounting hole 18 is formed in such a manner that it is opened up in the back face 12, while it is a bottomed hole into which there can be inserted a motor mounting screw 81 for fixing the motor 50. In the motor mounting hole 18, there is formed a female screw with which a motor mounting screw 81 can be threadedly engaged. The motor mounting screw 81 can be penetrated through a motor mounting penetration hole 52 formed in the flange portion 51 of the motor 50 and is threadedly engaged into the motor mounting hole 18.

Figure 3:
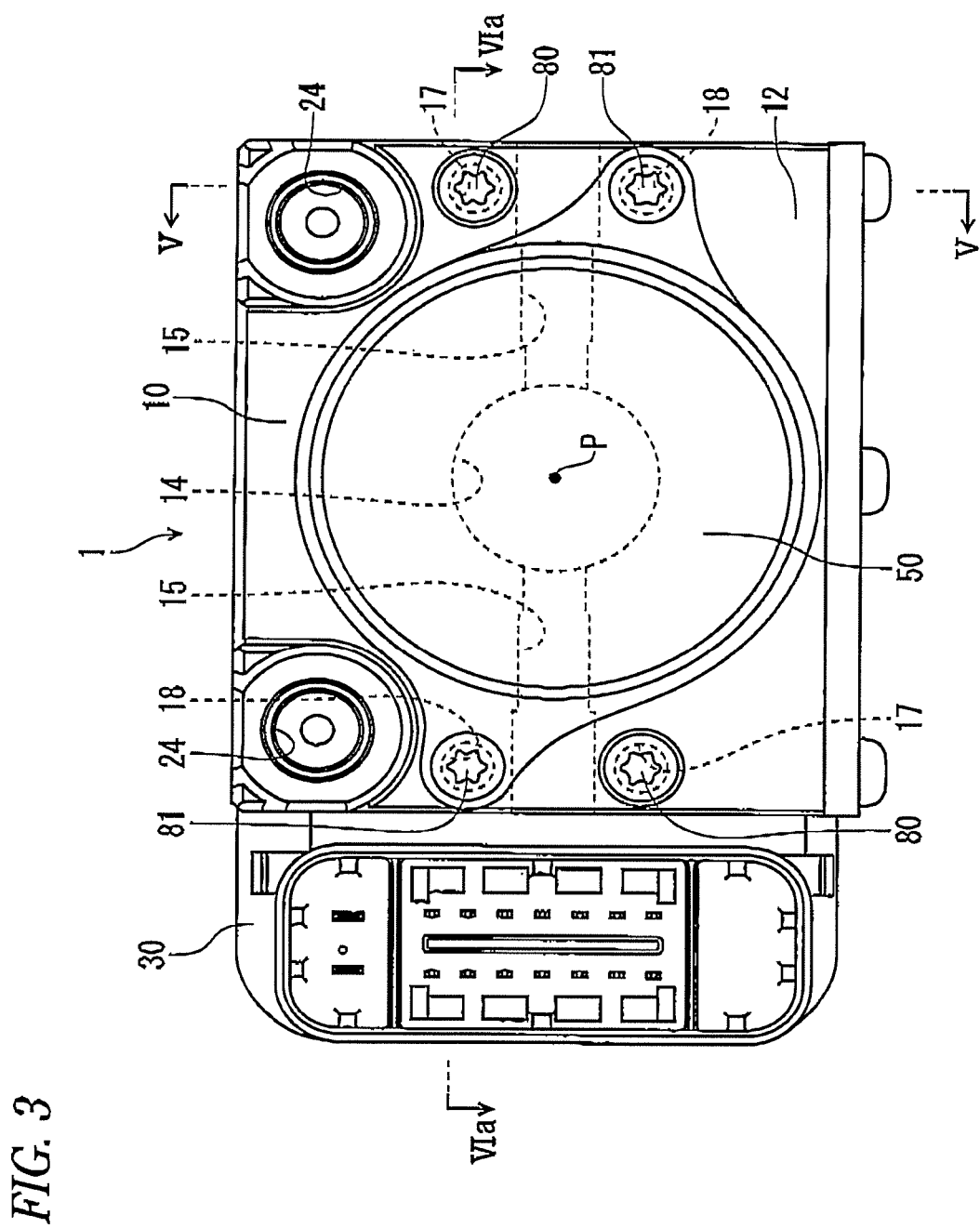
FIG. 3 is a back view of the brake hydraulic pressure control apparatus for a vehicle according to the embodiment of the invention.

As shown in FIG. 3, the housing mounting penetration holes 17 are respectively disposed at two positions that are point-symmetric with respect to the center P of the rotation shaft storage hole 14 when viewed from the back face side of the base member 10. Also, the motor mounting holes 18 are respectively disposed at other two positions than the positions of the housing mounting penetration holes 17, wherein the other two positions are point-symmetric with respect to the center P of the rotation shaft storage hole 14 when viewed from the back face side of the base member 10. Further, the housing mounting penetration holes 17, 17 and motor mounting holes 18, 18 are arranged to constitute the vertices of a quadrangle (in the present embodiment, a rectangle) when viewed from the back face of the base member 10. The brake hydraulic pressure control apparatus 1 is structured such that the center of gravity thereof after assembled is situated inside the rectangle constituted of the positions of the two housing mounting penetration holes 17, 17 and the positions of the two motor mounting holes 18, 18.

The housing mounting penetration holes 17 and motor mounting holes 18 are arranged in such a manner that they sandwich the pump storage holes 15 at positions where the housing mounting penetration holes 17 and motor mounting holes 18 do not interfere with the pump storage hole 15. In other words, just above the respective pump storage holes 15, there are arranged one of the housing mounting penetration hole 17 and motor mounting hole 18; and, just below the respective pump storage holes 15, there are arranged the other of the housing mounting penetration hole 17 and motor mounting hole 18. Here, a vertical direction in the present embodiment is a vertical direction shown in FIG. 1 and, in some cases, it can be different from the vertical direction when the brake hydraulic pressure control apparatus 1 is mounted on the vehicle body. The pump storage holes 15 are respectively arranged at the positions that are sandwiched by the housing mounting penetration holes 17 and motor mounting holes 18 from above and from below.

Specifically, just above the pump storage hole 15 that is situated on the left side when viewed from the back face of the base member, there is arranged the motor mounting hole 18 and, just below the same pump storage hole 15, there is arranged the housing mounting penetration hole 17. On the other hand, just above the pump storage hole 15 that is situated on the right side when viewed from the back face of the base member, there is arranged the housing mounting penetration hole 17 and, just below the same pump storage hole 15, there is arranged the motor mounting hole 18. Here, in the present invention, the expression "just above the pump storage hole 15" means the position that exists upwardly of the pump storage hole 15, does not interfere with the pump storage hole 15, and can secure the thickness between the pump storage hole 15 and housing mounting penetration hole 17 or motor mounting hole 18. And, the expression "just below the pump storage hole 15" means the position that exists downwardly of the pump storage hole 15, does not interfere with the pump storage hole 15, and can secure the thickness between the pump storage hole 15 and housing mounting penetration hole 17 or motor mounting hole 18.

In other words, a straight line connecting together the housing mounting penetration holes 17, 17 and a straight line connecting together the motor mounting holes 18, 18 intersect each other with the center P of the rotation shaft storage hole 14 as the point of intersection. The respective straight lines are equal in length to each other, intersect each other in their respective center positions and constitute the diagonal line of a rectangle. Further, in the vertical direction in FIG. 3, the housing mounting penetration hole 17 and motor mounting hole 18, which exist upwardly, are situated at the same height position; and, the housing mounting penetration hole 17 and motor mounting hole 18, which exist downwardly, are situated at the same height position.

Further, the housing mounting penetration hole 17 and motor mounting hole 18, which exist upwardly of the pump storage hole 15, are respectively formed between the pump storage hole 15 and entrance ports 24, 24 respectively formed in the right and left upper portions of the back face 12. And, the upwardly situated housing mounting penetration hole 17 (or motor mounting hole 18) and the downwardly situated motor mounting hole 18 (or housing mounting penetration hole 17) are arranged line symmetry with respect to the center axis line of the pump storage hole 15. That is, the upper housing mounting penetration hole 17 and lower motor mounting hole 18 are spaced equally from the center axis line of the pump storage hole 15. Also, the housing mounting penetration hole 17 and motor mounting hole 18 are both formed at positions which are situated nearer to the outside (the side face 13 of the base member 10) than the center position of the entrance port 24.

Figure 4:
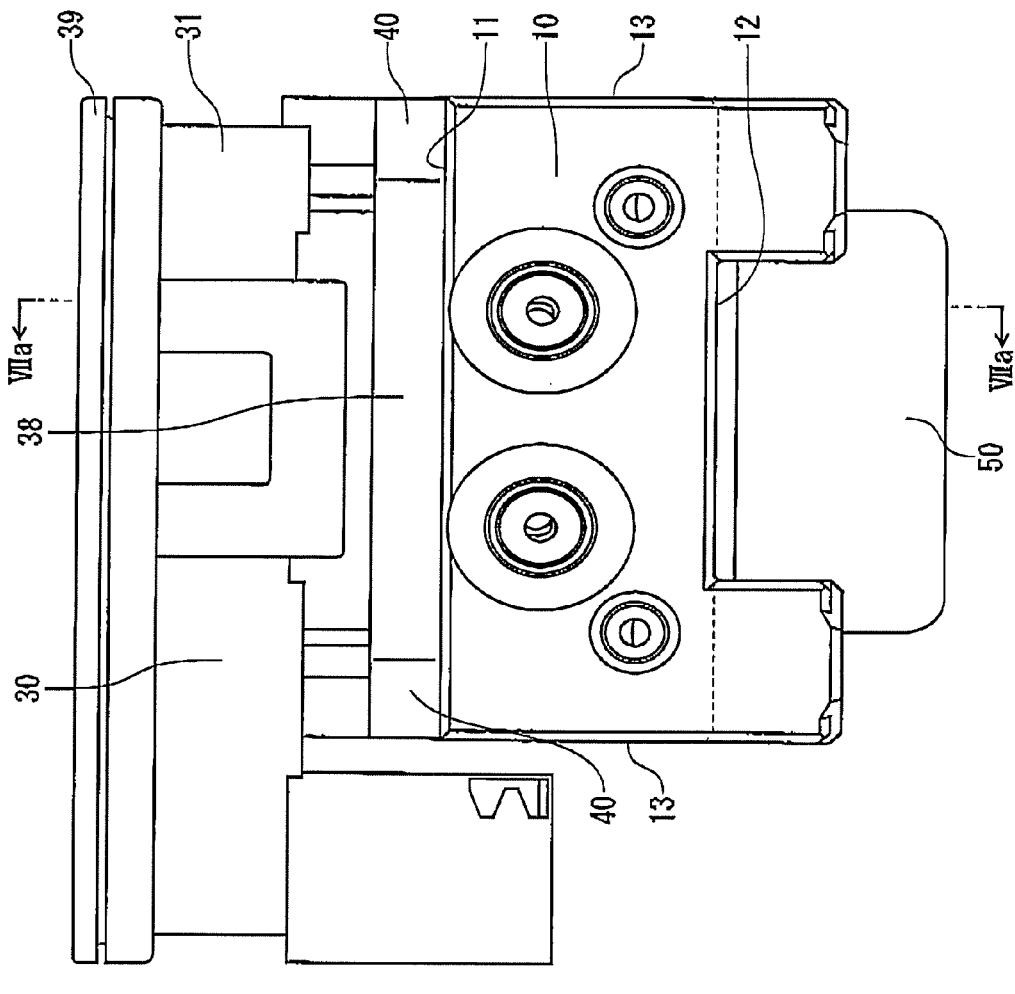
FIG. 4 is a top plan view of the brake hydraulic pressure control apparatus for a vehicle according to the embodiment of the invention.

As shown in FIGS. 1 and 4, the control housing 30 includes various electric parts and a housing main body portion 31 and is structured in such a manner that the electric parts are respectively mounted on the housing main body portion 31. The electric parts include a coil assembly 32 (see FIG. 1) to be mounted on an electromagnetic valve 20 which can be mounted on the base member 10, a control base plate 37 constituting a control unit for controlling the operation of the electromagnetic valve 20, and other parts.

Figure 6A:
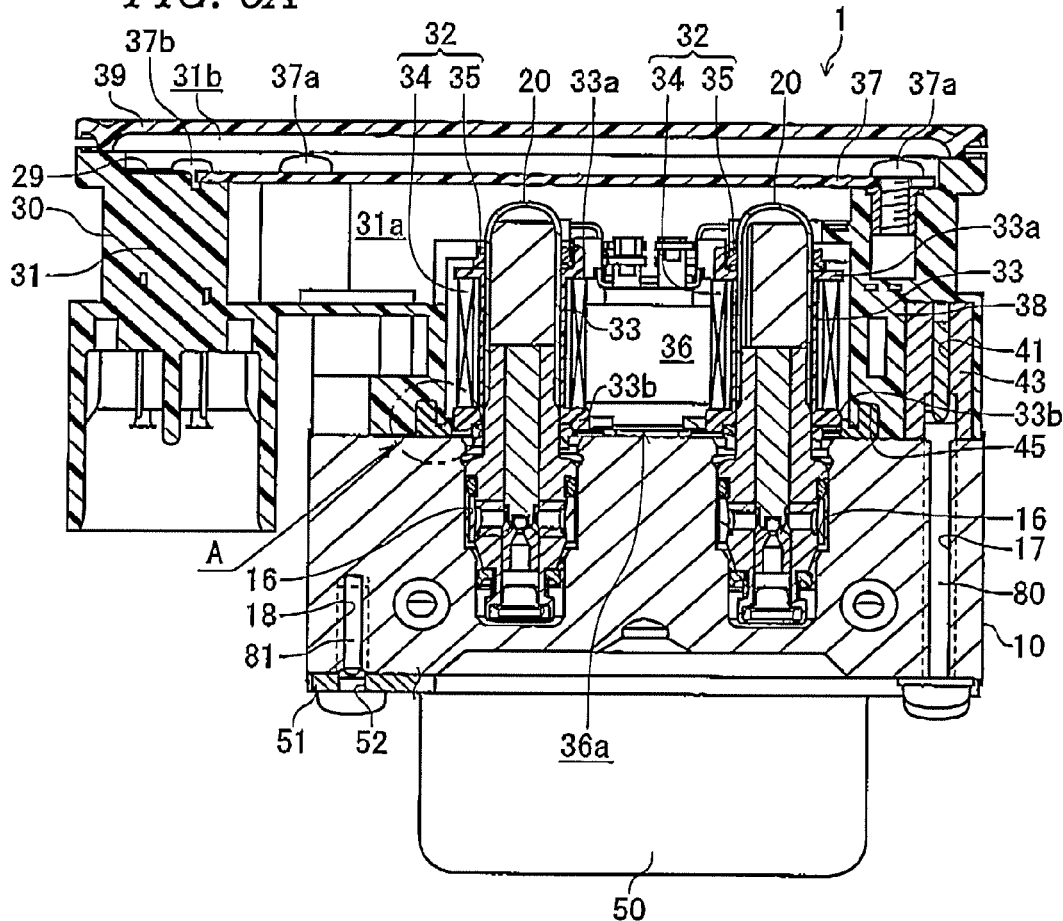
FIG. 6A is a section view taken along the VIa-VIa line shown in FIG. 3.
Figure 7A:
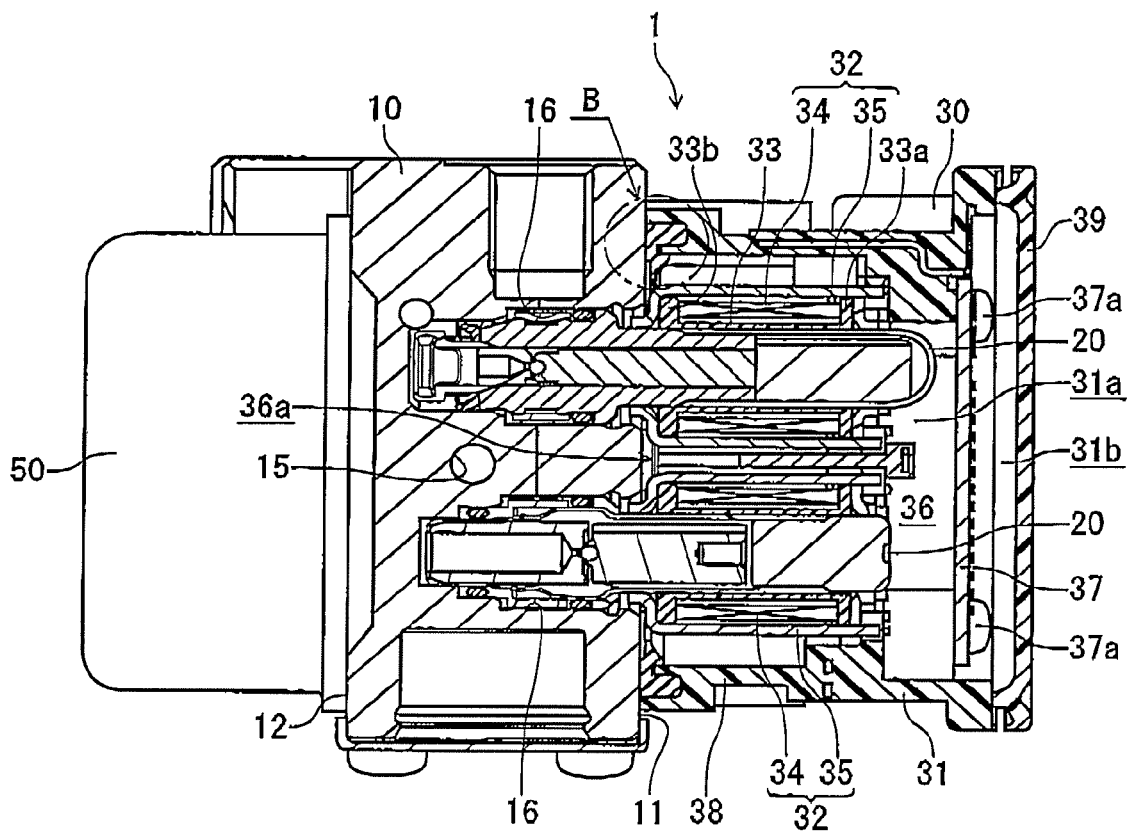
FIG. 7A is a section view taken along the VIIa-VIIa line shown in FIG. 4.

As shown in FIGS. 6A and 7A, the coil assembly 32 includes a solenoid coil 34 and a magnetic path frame 35. The solenoid coil 34 can be formed by winding an electric wire around a bobbin 33 surrounding the projecting portion of the electromagnetic valve 20 projecting from the base member 10. In the axial direction two ends of the bobbin 33, there are formed flange portions 33a and 33b respectively. The magnetic path frame 35 is mounted on the bobbin 33 in such a manner that it surrounds the axial direction two ends of the bobbin 33.

As shown in FIGS. 6A to 8B, a housing main body portion 31 is made of resin and includes, in the inside thereof, the electromagnetic valve 20 provided on one face 11 of the base member 10 and a storage space 36 for storing the coil assembly 32. The storage space 36 is formed such that it is opposed to one face 11 of the base member 10. As shown in FIGS. 6A and 7A, on the housing main body portion 31, there is mounted a control base plate 37 which separates the internal space of the housing main body portion 31 into two separation portions. Specifically, the internal space is separated by the control base plate 37 into a first storage portion 31a situated on the base member side and a second storage portion 31b situated on the counter-base-member side (on the opposite side of the base member 10). On the opening of the second storage portion 31b of the housing main body portion 31, there is mounted a cover member 39 which is used to close the second storage portion 31b. The storage space 36 is constituted of the first storage portion 31a and is separated from the control base plate 37 by a peripheral wall portion 38 which extends toward the base member 10. The peripheral wall portion 38 constitutes a portion of the housing main body portion 31. The control base plate 37 is fixed to the housing main body portion 31 through multiple screws 37a (see FIGS. 6A and 7A). Also, the control base plate 37 is electrically connected to the terminal 29 of the housing main body portion 31 by a wire bonding 37b (see FIG. 6A).

Figure 8A:
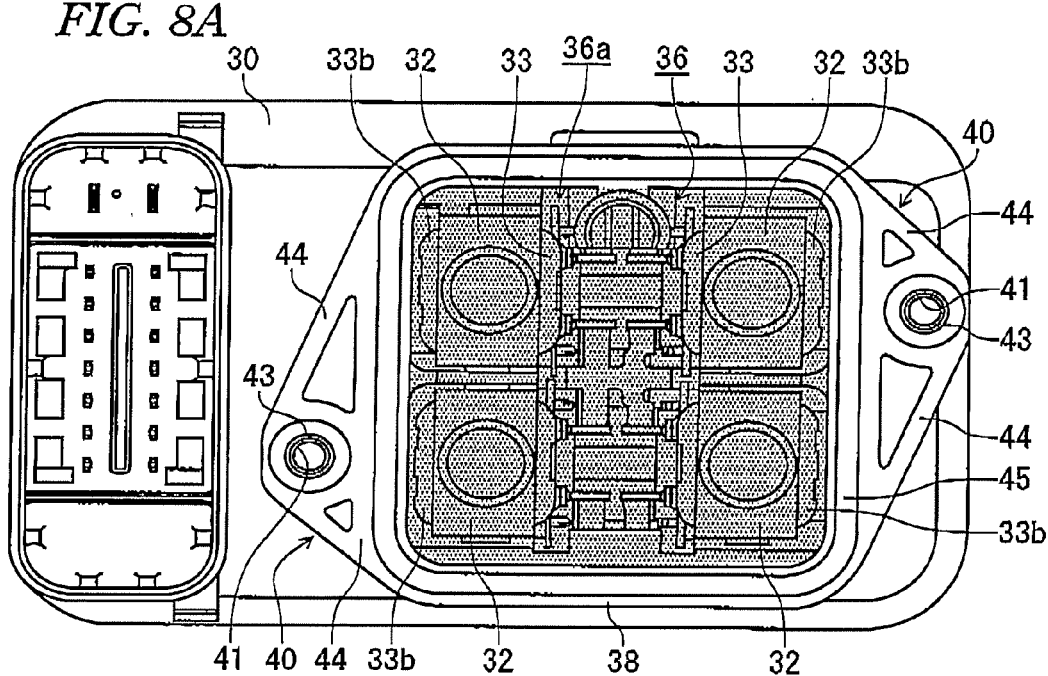
FIG. 8A is a back view of a control housing.

As shown in FIG. 8A, the peripheral wall portion 38 is formed to have a quadrangle (in the present embodiment, square) frame shape. Here, in the present invention, the "quadrangle" or "square" member may also include a member the projecting corner portions of which are respectively chamfered in a curved shape or are chamfered in an oblique shape. Of the four sides of the peripheral wall portion 38, on the paired sides that are disposed opposed to each other (in FIG. 8, the sides that are situated in the horizontal direction), there are provided the paired flange portions 40 that respectively project outwardly. Each flange portion 40 includes a housing fixing hole 41 with which the housing mounting screw 80 can be threadedly engaged, and reinforcing ribs 44.

As shown in FIG. 5, the housing fixing hole 41 is defined by a bush 43 which is embedded in the housing main body portion 31 by insert molding. The bush 43 is a metal member having a cylindrical shape. In the inner peripheral portion of the bush 43, there is formed a female screw and the housing fixing hole 41 is constituted of such inner peripheral portion. The housing fixing hole 41 is disposed in such a manner that, in a state where the control housing 30 is mounted on the base member 10, it is coaxial with the housing mounting penetration hole 17. One end of the bush 43 on the side of the base member 10 is opened in the face (the open end face of the peripheral wall portion 38) of the housing main body portion 31 that is opposed to the base member 10, whereas the other end is covered with and closed by the resin of the housing main body portion 31.

As shown in FIG. 8A, the reinforcing ribs 44 are respectively constituted of resin which extends from the peripheral portion of the housing fixing hole 41 to the outer peripheral edge portion of the peripheral wall portion 38 (in the present embodiment, the projecting corner portions of the peripheral wall portion 38). The reinforcing ribs 44 are formed two apiece in the two housing fixing holes 41. The reinforcing ribs 44 extend linearly and go from the peripheral portions of the housing fixing holes 41 toward the projecting corner portions of the peripheral wall portion 38. The reinforcing ribs 44 extend toward the nearest and second nearest ones of the four projecting corner portions. Here, the thickness of the portion that exists between the reinforcing ribs 44 and peripheral wall portion 38 is reduced in order to reduce the weight thereof.

As the peripheral wall portion 38 is formed to have a square frame-like shape, the opening portion 36*a* (in FIG. 8A, shown by screen hatchings) of the control housing 30 existing on the base member side is also formed to have a square shape. The opening portion 36*a* has a shape substantially equal to the projection shape of the inner peripheral face of the peripheral wall portion 38 and extends in the range of the substantial opening of the storage space not including a recessed groove 45 (which will be discussed later). The opening portion 36*a* is formed in such a size that can be stored in the range of a circle the two ends of the diameter of which, when viewed from the back face side of the base member, are defined by the axial positions of the two housing fixing holes 41 (the center positions of the housing mounting penetration holes 17, 17 (see FIG. 3)). Due to this, the opening portion 36*a* is structured such that the width thereof can be prevented from being excessively larger than the distance between the fixing portions of the control housing 30 (housing mounting penetration holes 17 and 17).

When viewed from the back face of the base member, the control housing 30 is disposed and fixed in such a manner that the center position of the opening portion 36*a* is overlapped with the position of the axial center of the rotation shaft of the motor 50 (see FIGS. 6A and 7A).

Figure 6B:
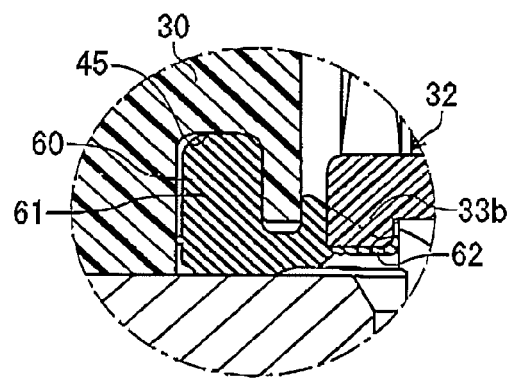
FIG. 6B is an enlarged view of the A portion shown in FIG. 6A.
Figure 7B:
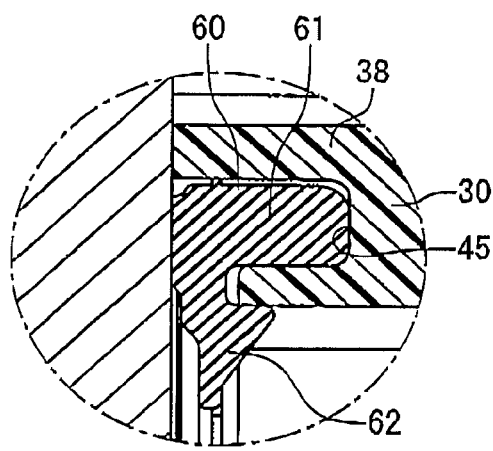
FIG. 7B is an enlarged view of the B portion shown in FIG. 7A.

As shown in FIGS. 6B, 7B and 8A, in the opening portion side leading end of the peripheral wall portion 38, there is formed a recessed groove 45 for fixing a seal member 60. The recessed groove 45 is formed to have a square shape in such a manner that it surrounds the opening portion. Into the recessed groove 45, there can be stored a portion of the seal member 60.

Figure 9A:
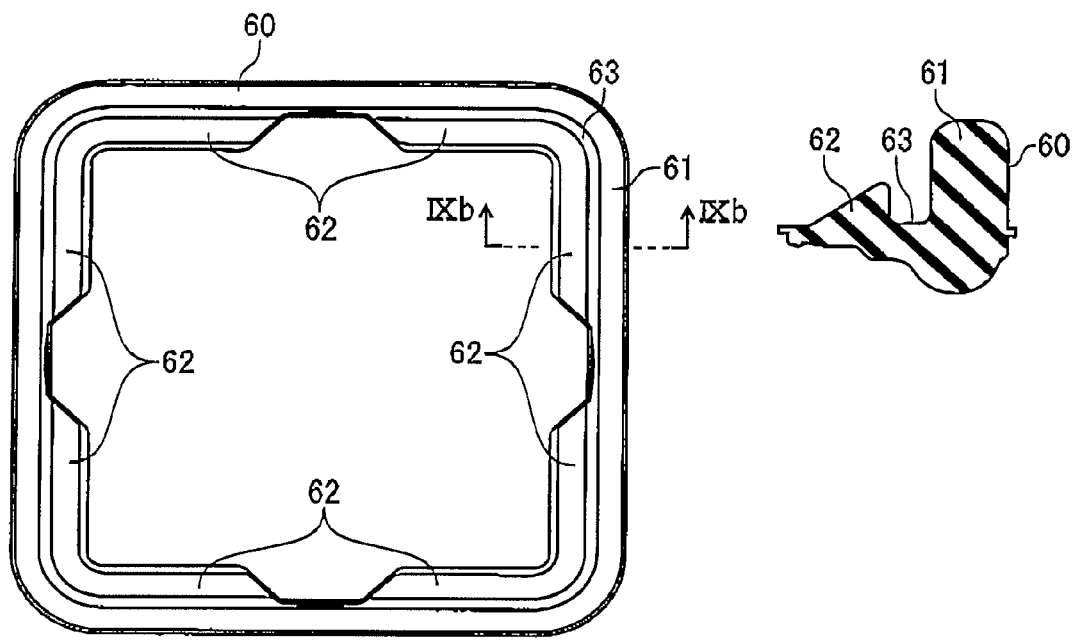
FIG. 9A is a back view of the seal member.
Figure 9B:
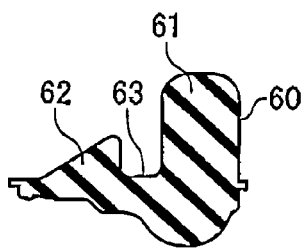
FIG. 9B is a section view of the seal member taken along the IXb-IXb line shown in FIG. 9A.
Figure 9C:
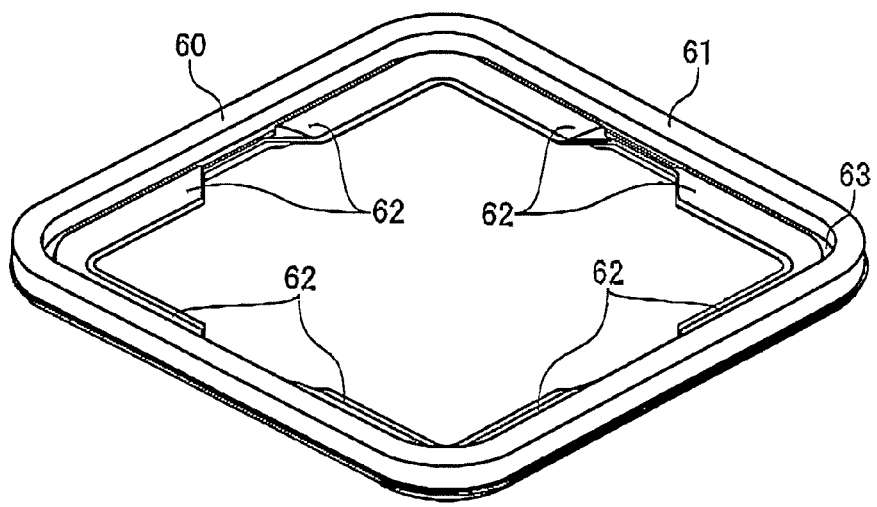
FIG. 9C is a perspective view of the seal member.

The seal member 60 is used to prevent moisture from invading into the control housing 30. As shown in FIGS. 9A to 9C, the seal member 60 includes a peripheral edge portion 61 having a quadrangle frame shape extending along the peripheral wall portion 38, and multiple belt-shaped tongue portions 62 respectively projecting from the respective sides of the peripheral edge portion 61 inwardly thereof. The peripheral edge portion 61 is formed to have a square frame shape the sides of which have a length equal to the recessed groove 45. The peripheral edge portion 61 can be stored into the recessed groove 45 in a compressed state. When the control housing 30 is fixed to the base member 10, the peripheral edge portion 61 is compressed by the recessed groove 45 and one face of the base member 10, whereby the seal member 60 is fixed in a compressed state.

The tongue portions 62 are respectively formed in the respective sides of the peripheral edge portion 61. The tongue portions 62, 62, which are formed in the mutually adjoining sides of the peripheral edge portion 61, are formed continuously with each other. Each tongue portion 62 is formed such that it extends from the lower end portion of the peripheral portion 61 inwardly thereof, while the seal member 60 has an L-shaped section. The tongue portions 62 are respectively formed in a belt-shaped manner along the longitudinal direction of the peripheral edge portion 61. And, the tongue portions 62 are respectively formed such that they become thinner as they go toward their respective leading end portions. In the respective base end portions of the tongue portions 61, there are formed grooves 63 into which the wall portion of the recessed groove 45 can be inserted, thereby enhancing the seal performance of the seal member 60.

Figure 8B:
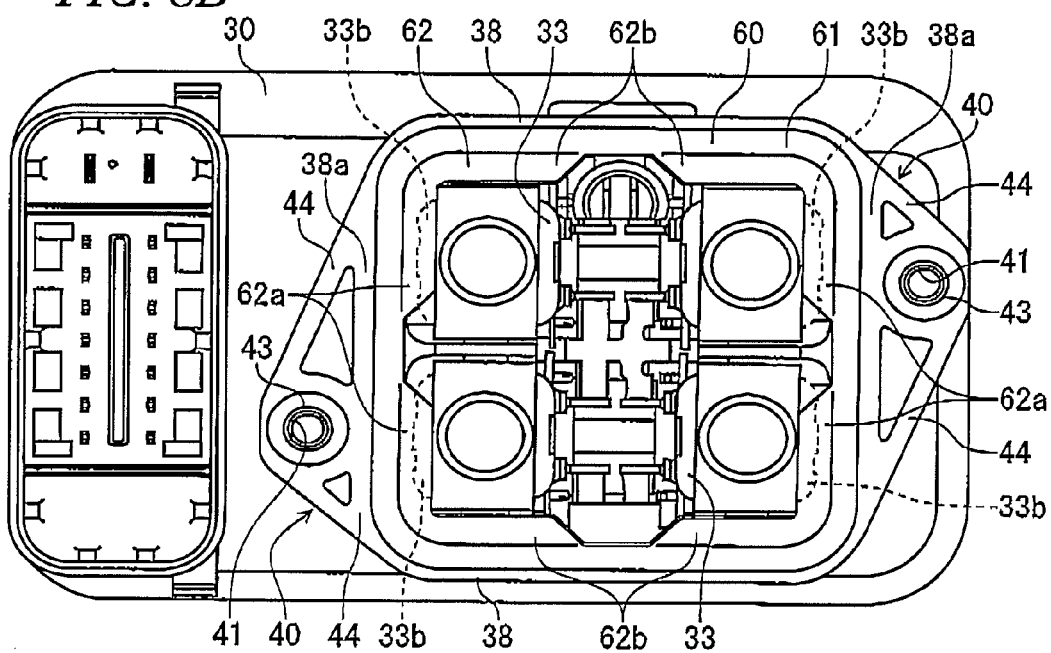
FIG. 8B is a back view of the control housing, showing a state where a seal member is mounted on the control housing.

As shown in FIG. 8B, each tongue portion 62 includes first tongue portions 62 (which, in some cases, are also referred to as "fixed portion adjacent tongue portions 62*a*") respectively formed in the paired sides (which, in some cases, are also referred to as "fixed portion adjacent sides 38*a*") of the peripheral wall portion 38 adjoining the housing fixing hole 41, and second tongue portions 62 (which, in some cases, are also referred to as "fixed portion remote tongue portions 62*b*") respectively formed in the other sides than the paired side respectively extending in a direction perpendicular to the first tongue portions 62.

Of the tongue portions 62 formed in the four sides of the peripheral edge portion 61, the first tongue portions 62 (fixed portion adjacent tongue portions 62*a*) are respectively held by the base member 10 and coil assemblies 32 provided within the control housing 30. Specifically, the first tongue portions 62 are held by the face of one face 11 of the base member 10 and the flange portions 33*b* of the bobbins 33 of the coil assemblies 32. On the other hand, the second tongue portions 62 (fixed portion remote tongue portions 62*b*) do not touch the coil assemblies 32. In the present embodiment, the four coil assemblies 32 are arranged in two lines; and, each coil assembly 32 is disposed in such a manner as to touch its associated fixed portion adjacent tongue portion 62*a* but not to touch the other tongue portion extending perpendicularly to the longitudinal direction of the fixed portion adjacent tongue portion 62*a*. That is, each coil assembly 32 is disposed adjacently to the fixed portion adjacent tongue portion 62*a*, while it is disposed spaced from the fixed portion remote tongue portion 62*b*.

The tongue portions 62 are respectively formed in the respective sides of the square of the peripheral edge portion 61 in such a manner that they are the same in shape. Due to this, since the seal member 60 has a square shape the respective sides of which have the same shape, even when the seal member 60 is rotated at an angle of 90 degree, it still shows the same shape. Therefore, the respective tongue portions 62 are able to provide any one of the fixed portion adjacent tongue portion 62*a* and fixed portion remote tongue portions 62*b*.

According to the above-structured brake hydraulic pressure control apparatus 1, since the housing mounting penetration holes 17 and motor mounting holes 18 are respectively disposed at two, positions that are point-symmetric with respect to the center of the rotation shaft storage hole 14, the present control apparatus can be disposed in such a manner that it balances well in weight. Due to this, the fastening force of the housing mounting screw 80 can be transmitted to the peripheral wall portion 38 of the control housing 30 in a properly balanced manner, and also the fastening force of the motor mounting screw 81 can be transmitted to the flange portion 51 of the motor 50 in a properly balanced manner. This can minimize the number of mounting portions where the control housing 30 and motor 50 are mounted on the base member 10, thereby being able to reduce the number of the housing mounting screws 80 and motor mounting screws 81. Also, this can reduce the installation space of the base member 10 where the housing mounting penetration holes 17 and motor mounting holes 18 are formed, which can conserve the space of the base member 10 and can realize freer layout of other elements such as flow passages. Accordingly, the base member 10 can be made compact and thus the brake hydraulic pressure control apparatus 1 can also be made compact.

Also, according to the present embodiment, since the positions of the two housing mounting penetration holes 17 and two motor mounting holes 18 are respectively set to constitute the vertices of a quadrangle, the present apparatus can balance well in weight in the horizontal direction and also in the vertical direction. This can enhance the anti-vibration properties of the present apparatus and also can reduce the size of the base member 10 further.

Further, since the positions of the two housing mounting penetration holes 17 and two motor mounting holes 18 are set in such a manner that they sandwich the pump storage hole 15 from above and from below at such positions as do not interfere with the pump storage hole 15, the wasteful use of the vertical space of the base member 10 can be prevented and thus the vertical dimensions of the base member 10 can be minimized.

And, according to the present embodiment, since the opening portion 36a of the storage space 36 of the control housing 30 is structured such that it can be stored in the range of a circle the two ends of the diameter of which are constituted of the positions of the two housing mounting penetration holes 17, the whole of the opening portion 36a can be prevented from being excessively distant from the fixed portion of the control housing 30. Therefore, the fastening forces of the two housing mounting screws 81 can be transmitted effectively to the whole periphery of the opening portion 36a of the storage space 36. This can enhance the performance to fix the control housing 30 to the base member 10 and also the seal performance to be provided by the seal member 60 can be enhanced.

Further, since the opening portion 36a is formed to have a square shape, the weight balance of the two housing mounting screws 81 with respect to the opening portion 36a can be enhanced further. This can further enhance the performance to fix the control housing 30 to the base member 10.

And, through the reinforcing ribs 44 provided on the outside of the peripheral wall portion 38 of the control housing 30, the fastening forces of the two housing mounting screws 80 can be transmitted effectively to the outer peripheral edge portion of the peripheral wall portion 38. Due to this, over the whole periphery of the peripheral wall portion 38, the control housing 30 can be pressed against the base member 10. This can enhance the fixing performance still further and also can enhance the seal performance that is provided by the seal member 60.

Also, according to the present embodiment, since the present apparatus is structured such that the position of the axial center of the rotation shaft of the motor 50 and the position of the center of the opening portion 36a of the control housing 30 are overlapped with each other, the motor 50 and control housing 30 can be both fixed in a well balanced manner simultaneously.

On the other hand, according to the present embodiment, since the coil assemblies 32 are respectively disposed such that they can be contacted with the fixed portion adjacent tongue portions 62a (first tongue portions 62) but not with the fixed portion remote tongue portions 62b (second tongue portions 62), the vibrations of the coil assemblies 32 can be efficiently absorbed by the tongue portions 62 existing adjacently to the portion that is strongly fixed by the housing mounting screws 80. Also, in the tongue portions (fixed portion adjacent tongue portions 62a) held by the coil assemblies 32 and base member 10, there are generated reacting forces (restoring forces). However, since these portions are strongly fastened by the housing mounting screws 80 respectively, the control housing 30 and coil assemblies 32 are prevented from being separated from the base member 10. Therefore, there is no possibility that the seal performance of these portions can be lowered. Further, in the fixed portion remote tongue portions 62b relatively distant from the portions that are strongly fixed by the housing mounting screws 80, the vibrations of the coil assemblies 32 are hard to be transmitted. Still further, since the fixed portion remote tongue portions 62b are not held by the coil assemblies 32 and base member 10, in the tongue portions 62, there are not generated reacting forces (forces which go in a direction to separate the coil assemblies 32 from the base member 10) larger than necessary. Therefore, even in the fixed portion remote tongue portions 62b that are not fastened by the housing mounting screws 80, the control housing 30 will not be deformed, thereby being able to prevent the seal performance of these portions from being lowered.

Also, since, even when the seal member 60 is rotated at an angle of 90 degree, the seal member 60 shows the same shape, the seal member 60 can be assembled freely in any installation directions at a unit of 90 degree. This eliminates the need to restrict the installation direction of the seal member 60, thereby being able to facility the assembling operation of the seal member 60.

Although description has been given heretofore of the embodiment for carrying out the invention, the invention is not limited to the above-mentioned embodiment but the design of the embodiment can be changed properly without departing from the subject matter of the invention. For example, in the above embodiment, the peripheral wall portion 38 is formed to have a square frame shape but this is not limitative: that is, the peripheral wall portion may also have a rectangular shape or other shapes provided that variations in the distance dimensions from the center of the peripheral wall portion 38 to the peripheral edge portion thereof are small. For instance, the peripheral wall portion 38 may have a circular frame shape or an elliptic frame shape. In this case, preferably, the reinforcing rib 44 may be formed such that it extends from the peripheral portion of the housing fixing hole 41 while it touches the outer peripheral portion of the peripheral wall portion 38 as the tangent line thereof.

Also, in the above embodiment, the tongue portion 62 of the seal member 60 includes the fixed portion adjacent tongue portion 62a and fixed portion remote tongue portion 62b. However, this is not limitative but, for example, the tongue portion 62 may also include only the fixed portion adjacent tongue portion 62a (exclude the fixed portion remote tongue portion 62b).

Further, in the above embodiment, there is employed the structure in which the positions of the two housing mounting penetration holes 17 and the positions of the two motor mounting holes 18 are set to constitute the vertices of a quadrangle. However, the shape is not limited to the quadrangle but, for example, there may also be employed a parallelogram.

Also, according to the above embodiment, there is shown an example in which the control housing 30 is fixed to the base member 10 using the two housing mounting screws 80. But, the invention is not limited to this. The number of housing mounting screws may be three or more, provided that they can be disposed in a well balanced manner. However, when the reduction of the size of the base member is taken into consideration, preferably, the number of housing mounting screws to be used may be smaller.

What is claimed is:
1. A brake hydraulic pressure control apparatus for a vehicle, the apparatus comprising:
a base member;
a control housing including a storage space for storing an electromagnetic valve provided on one face of the base member and a coil assembly to be mounted onto the electromagnetic valve; and
a pump driving motor provided on a back face opposed to the one face of the base member , wherein the base member are provided with:
two housing mounting penetration holes wherein each of the housing mounting penetration holes is so formed as to penetrate from the one face to the back face and through which a housing mounting screw for fixing the control housing is to be inserted;
two motor mounting holes, wherein each of the motor mounting holes is opened up in the back face and into which a motor mounting screw for fixing the motor is to be inserted; and
a rotation shaft storage hole which is opened up in the back face and into which a rotation shaft of the motor is to be stored,
wherein the housing mounting penetration holes are disposed point-symmetrically with respect to the center of the rotation shaft storage hole,
wherein the motor mounting holes are disposed point-symmetrically with respect to the center of the rotation shaft storage hole and are disposed at different positions from positions where the housing mounting penetration holes are disposed, and wherein
a peripheral wall portion of the control housing that defines the storage space is formed to have a quadrangle frame shape,
of the four sides of the peripheral wall portion, in a pair of sides opposed to each other, there are formed flange portions respectively projecting outwardly,
housing fixing holes are formed in the flange portions so as to be threadedly engageable with the housing mounting screws,
a seal member is interposed between the one face of the base member and the peripheral wall portion,
the seal member includes a quadrangle frame shaped peripheral edge portion extending along the peripheral wall portion and a plurality of belt-shaped tongue portions respectively projecting from their associated sides of the peripheral edge portion inwardly,
the tongue portions include first tongue portions respectively formed in a pair of sides of the seal member corresponding to the pair of sides of the peripheral wall portion which are adjacent to the housing fixing holes, and
the tongue portions are held between the base member and the coil assembly only at positions where the first tongue portions are formed.

2. The brake hydraulic pressure control apparatus of claim 1, wherein the peripheral wall portion and the peripheral edge portion of the seal member are respectively formed to have a square frame shape.

3. The brake hydraulic pressure control apparatus of claim 1,
wherein the tongue portions further include second tongue portions respectively formed in the other sides of the seal member extending perpendicularly to the pair of sides of the seal member,
wherein the coil assembly is disposed spaced from the second tongue portions.

4. The brake hydraulic pressure control apparatus of claim 3,
wherein the first tongue portions and the second tongue portions are formed in the respective sides of the peripheral edge portion so as to have the same shape.

5. A brake hydraulic pressure control apparatus for a vehicle, the apparatus comprising:
a base member;
a control housing including a storage space for storing an electromagnetic valve provided on one face of the base member and a coil assembly to be mounted onto the electromagnetic valve; and
a pump driving motor provided on a back face opposed to one face of the base member,
wherein the control housing has a peripheral wall portion that defines the storage space and that is formed to have a quadrangle frame shape,
of the four sides of the peripheral wall portion, in a pair of sides opposed to each other, there are formed flange portions respectively projecting outwardly,
housing fixing holes are formed in the flange portions so as to be threadedly engageable with the housing mounting screws,
a seal member is interposed between the one face of the base member and the peripheral wall portion
the seal member includes a quadrangle frame shaped peripheral edge portion extending along the peripheral wall portion and a plurality of belt-shaped tongue portions respectively projecting from their associated sides of the peripheral edge portion inwardly,
the tongue portions include first tongue portions respectively formed in a pair of sides of the seal member corresponding to the pair of sides of the peripheral wall portion which are adjacent to the housing fixing holes, and
the tongue portions are held between the base member and the coil assembly only at positions where the first tongue portions are formed.

6. The brake hydraulic pressure control apparatus of claim 5,
wherein the peripheral wall portion and the peripheral edge portion of the seal member are respectively formed to have a square frame shape.

7. The brake hydraulic pressure control apparatus of claim 5,
wherein the tongue portions further include second tongue portions respectively formed in the other sides of the seal member extending perpendicularly to the pair of sides of the seal member,
wherein the coil assembly is disposed spaced from the second tongue portions.

8. The brake hydraulic pressure control apparatus of claim 7,
wherein the first tongue portions and the second tongue portions are formed in the respective sides of the peripheral edge portion so as to have the same shape.

9. The brake hydraulic pressure control apparatus of claim 5,
wherein the base member are provided with
two housing mounting penetration holes, wherein each of the housing mounting penetration holes is so formed as to penetrate from the one face to the back face and through which a housing mounting screw for fixing the control housing is to be inserted;
two motor mounting holes, wherein each of the motor mounting holes is opened up in the back face and into which a motor mounting screw for fixing the motor is to be inserted; and
a rotation shaft storage hole which is opened up in the back face and into which a rotation shaft of the motor is to be stored, wherein the housing mounting penetration holes are disposed point-symmetrically with respect to the center of the rotation shaft storage hole, wherein the motor mounting holes are disposed point-symmetrically with respect to the center of the rotation shaft storage hole and are disposed at different positions from positions where the housing mounting penetration holes are disposed, wherein the housing mounting penetration holes and the motor mounting holes are arranged to constitute vertices of a quadrangle when viewed from the back face.

10. The brake hydraulic pressure control apparatus of claim 9, wherein, in the base member, there are formed a pair of pump storage holes respectively penetrating from the rotation shaft storage hole to side faces of the base member, wherein the housing mounting penetration holes and the motor mounting holes are disposed to sandwich the pump storage holes at positions existing adjacently to the pump storage holes but not interfering with the pump storage holes.

11. The brake hydraulic pressure control apparatus of claim 9, wherein the center of gravity of the brake hydraulic pressure control apparatus is located inside the quadrangle.

12. A brake hydraulic pressure control apparatus for a vehicle, the apparatus comprising:

a base member;

a control housing including a storage space for storing an electromagnetic valve provided on one face of the base member and a coil assembly to be mounted onto the electromagnetic valve; and a pump driving motor provided on a back face opposed to the one face of the base member, wherein the base member are provided with:

two housing mounting penetration holes wherein each of the housing mounting penetration holes is so formed as to penetrate from the one face to the back face and through which a housing mounting screw for fixing the control housing is to be inserted;

two motor mounting holes, wherein each of the motor mounting holes is opened up in the back face and into which a motor mounting screw for fixing the motor is to be inserted; and a rotation shaft storage hole which is opened up in the back face and into which a rotation shaft of the motor is to be stored, wherein the housing mounting penetration holes are disposed point-symmetrically with respect to the center of the rotation shaft storage hole, wherein the motor mounting holes are disposed point-symmetrically with respect to the center of the rotation shaft storage hole and are disposed at different positions from positions where the housing mounting penetration holes are disposed, wherein the two housing mounting penetration holes and the two motor mounting holes are located such that:

a straight line connecting together the two housing mounting penetration holes and a straight line connecting together the two motor mounting holes intersect each other with the center of the rotation shaft storage hole as a point of intersection, the straight lines are equal in length to each other, intersect each other in their respective center positions and constitute a diagonal line of a rectangle.

13. A brake hydraulic pressure control apparatus for a vehicle, the apparatus comprising:

a base member;

a control housing including a storage space for storing an electromagnetic valve provided on one face of the base member and a coil assembly to be mounted onto the electromagnetic valve; and a pump driving motor provided on a back face opposed to the one face of the base member, wherein the base member are provided with:

two housing mounting penetration holes wherein each of the housing mounting penetration holes is so formed as to penetrate from the one face to the back face and through which a housing mounting screw for fixing the control housing is to be inserted;

two motor mounting holes, wherein each of the motor mounting holes is opened up in the back face and into which a motor mounting screw for fixing the motor is to be inserted; and a rotation shaft storage hole which is opened up in the back face and into which a rotation shaft of the motor is to be stored, wherein the housing mounting penetration holes are disposed point-symmetrically with respect to the center of the rotation shaft storage hole, wherein the motor mounting holes are disposed point-symmetrically with respect to the center of the rotation shaft storage hole and are disposed at different positions from positions where the housing mounting penetration holes are disposed, wherein an upper housing mounting penetration hole and an upper motor mounting hole are situated at a same height position, wherein a downwardly positioned housing mounting penetration hole and a downwardly positioned motor mounting hole are situated at a same height position.

* * * * *